(12) United States Patent
Kakumoto

(10) Patent No.: US 7,545,419 B2
(45) Date of Patent: Jun. 9, 2009

(54) SOLID-STATE PIXEL SENSITIVITY VARIATION CORRECTING IMAGE-SENSING DEVICE

(75) Inventor: Tomokazu Kakumoto, Nagaokakyo (JP)

(73) Assignee: Minolta Co., Ltd., Osaka (JP)

( * ) Notice: Subject to any disclaimer, the term of this patent is extended or adjusted under 35 U.S.C. 154(b) by 1249 days.

(21) Appl. No.: 10/396,874

(22) Filed: Mar. 25, 2003

(65) Prior Publication Data

US 2003/0214591 A1    Nov. 20, 2003

(30) Foreign Application Priority Data

Mar. 28, 2002    (JP)    ............... 2002-090869

(51) Int. Cl.
  *H04N 9/64*    (2006.01)
(52) U.S. Cl. ..................................... 348/243
(58) Field of Classification Search .......... 348/241–243
  See application file for complete search history.

(56) References Cited

U.S. PATENT DOCUMENTS

| 4,752,741 | A |   | 6/1988 | Kim et al. ................... 328/165 |
| 5,796,431 | A | * | 8/1998 | Yonemoto ................... 348/308 |
| 6,437,340 | B1 | * | 8/2002 | Finkler et al. .......... 250/370.11 |
| 7,030,921 | B2 | * | 4/2006 | Hagihara et al. ............. 348/308 |
| 2001/0013571 | A1 |   | 8/2001 | Kakumoto et al. ....... 250/208.1 |

FOREIGN PATENT DOCUMENTS

| DE | 199 45 023 A1 | 9/1999 |
| EP | 0 392 754 A2 | 10/1990 |
| EP | 0 845 900 A1 | 6/1998 |

* cited by examiner

*Primary Examiner*—James M Hannett
*Assistant Examiner*—Nicholas G Giles
(74) *Attorney, Agent, or Firm*—Sidley Austin LLP

(57) ABSTRACT

Switches SHS and RSM are turned on to hold an image signal at a negative electrode of a capacitor Cs, then a switch SHN is turned on to hold a noise signal at a positive electrode of a capacitor Cn. Then a switch RSP is turned on and then a switch MIX is turned on to combine together the image and noise signals thus held and thereby produce, as a voltage signal, a noise-free image signal at the node between the capacitor Cs and the switch MIX. Then a switch Sx is turned on to output the noise-free image signal.

16 Claims, 8 Drawing Sheets

SOLID-STATE PIXEL SENSITIVITY VARIATION CORRECTING IMAGE-SENSING DEVICE

This application is based on Japanese Patent Application No. 2002-90869 filed on Mar. 28, 2002, the contents of which are hereby incorporated by reference.

BACKGROUND OF THE INVENTION

1. Field of the Invention

The present invention relates to a solid-state image-sensing device in which variations in sensitivity among individual pixels are corrected for.

2. Description of the Prior Art

In a solid-state image-sensing device having photosensitive elements such as photodiodes, from one pixel after another, an image signal obtained as a result of image sensing and a noise signal representing the variation in sensitivity of that particular pixel are output by way of an output signal line. Here, by subtracting the noise signal of each pixel from the image signal of that pixel, it is possible to correct for variations in sensitivity among individual pixels. In a conventional solid-state image-sensing device, the image signal and the noise signal are fed through separate buffers to the non-inverting input terminal and the inverting input terminal, respectively, of a differential amplifier circuit, which then outputs the image signal corrected for the variation in sensitivity.

Feeding the image and noise signals through separate buffers in this way, however, results in the image signals from the pixels in one column being corrected to a different degree from the image signals from the pixels in another column, due to variations in the characteristics of the circuit elements constituting the two buffers. That is, when the image signals, fed through a plurality of buffers having different amplification factors, are corrected by the use of their respective noise signals, fed through a plurality of buffers having different amplification factors, the image signals are corrected to different degrees. These variations in the degree of correction appear as vertical stripes in the image reproduced from the image signals output from the differential amplifier circuit.

As an attempt to prevent fixed-pattern noise like the vertical stripes described above, the applicant of the present invention has proposed a solid-state image-sensing device in U.S. Patent Application Serial No. 2001/0013571 A1. In the solid-state image-sensing device proposed in this publication, each column of pixels is provided with a selection circuit 100 configured as shown in FIG. 11. A current signal output from a pixel G to an output signal line 101 is converted into a voltage signal by a constant-current source 102, and this voltage signal is fed to the selection circuit 100. When the signal thus fed in is an image signal, a switch SWa is turned on so that the image signal is sampled and held in a capacitor Ca; when the signal fed in is a noise signal, a switch SWb is turned on so that the noise signal is sample and held in a capacitor Cb.

As shown in FIG. 11, the output from the selection circuit 100 provided in each column is fed, by way of a single signal transmission line, to a correction circuit 103, of which only one is provided in one solid-state image-sensing device. At this time, in the selection circuit 100, a switch SWr is turned on to reset the input side of a buffer Ba, and then a switch SW1a is turned on so that the image signal sampled and held in the capacitor Ca is output through the buffer Ba. At this time, in the correction circuit 103, a switch SW2a is turned on so that the image signal is sampled and held in a capacitor Cc.

Then, in the selection circuit 100, the switch SWr is turned on to reset the input side of the buffer Ba, and then a switch SW1b is turned on so that the noise signal sampled and held in the capacitor Cb is output through the buffer Ba. At this time, in the correction circuit 103, a switch SW2b is turned on so that the noise signal is sampled and held in a capacitor Cd.

When the image and noise signals are sampled and held in the correction circuit 103 in this way, they are fed through buffers Bb and Bc to the non-inverting input terminal and the inverting input terminal, respectively, of a differential amplifier circuit 104, which then outputs the image signal cleared of the noise component. Thus, the image and noise signals from the pixels belonging to the same column are fed, all through the same buffer Ba provided in that column, to the correction circuit 103. As a result, the image signals output from the correction circuit 103 are corrected for variations due to the characteristics of the buffer Ba. This helps alleviate fixed-pattern noise.

In the solid-state image-sensing device proposed in United States Patent Application Serial No. 2001/0013571 A1, the image and noise signals are output to the correction circuit 103 with different timing. Therefore, for this solid-state image-sensing device to output signals at a rate comparable with that of a solid-state image-sensing device that outputs image signals alone without clearing them of noise components, the selection circuit 100, which outputs both image and noise signals to the correction circuit 103, needs to operate at twice the rate at which image signals are read out.

However, there is a limit to the rate at which image signals can be read out. Specifically, if image signals are read out too fast, it is not possible to secure a sufficient exposure time, and therefore it is not possible to obtain sufficiently high outputs. Thus, the selection circuit 100 needs to operate at a rate reduced according to the rate at which image signals are read out. As a result, the operation of the solid-state image-sensing device as a whole takes an accordingly long time, imposing a limit on the highest possible rate at which it can operate.

SUMMARY OF THE INVENTION

An object of the present invention is to provide a solid-state image-sensing device that operates fast despite outputting image signals cleared of noise for each column of pixels.

To achieve the above object, according to one aspect of the present invention, a solid-state image-sensing device is provided with: a pixel that generates an image signal commensurate with the amount of incident light and a noise signal representing the variation in sensitivity; and an output circuit that holds, with opposite polarities, the image and noise signals output from the pixel and that combines together the image and noise signals thus held with opposite polarities so as to produce and output a noise-free image signal.

According to another aspect of the present invention, a solid-state image-sensing device is provided with: a plurality of pixels arranged in a matrix-like array and each generating an image signal commensurate with the amount of incident light and a noise signal representing the variation in sensitivity; and an output circuit that holds, with opposite polarities, the image and noise signals output consecutively from one pixel after another in one row of pixels, and that combines together the image and noise signals thus held with opposite polarities so as to produce and output, for one column of pixels after another, noise-free image signals.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

First Embodiment

A first embodiment of the present invention will be described below with reference to the drawings.

1. Configuration of a Solid-State Image-Sensing Device

Figure 1:
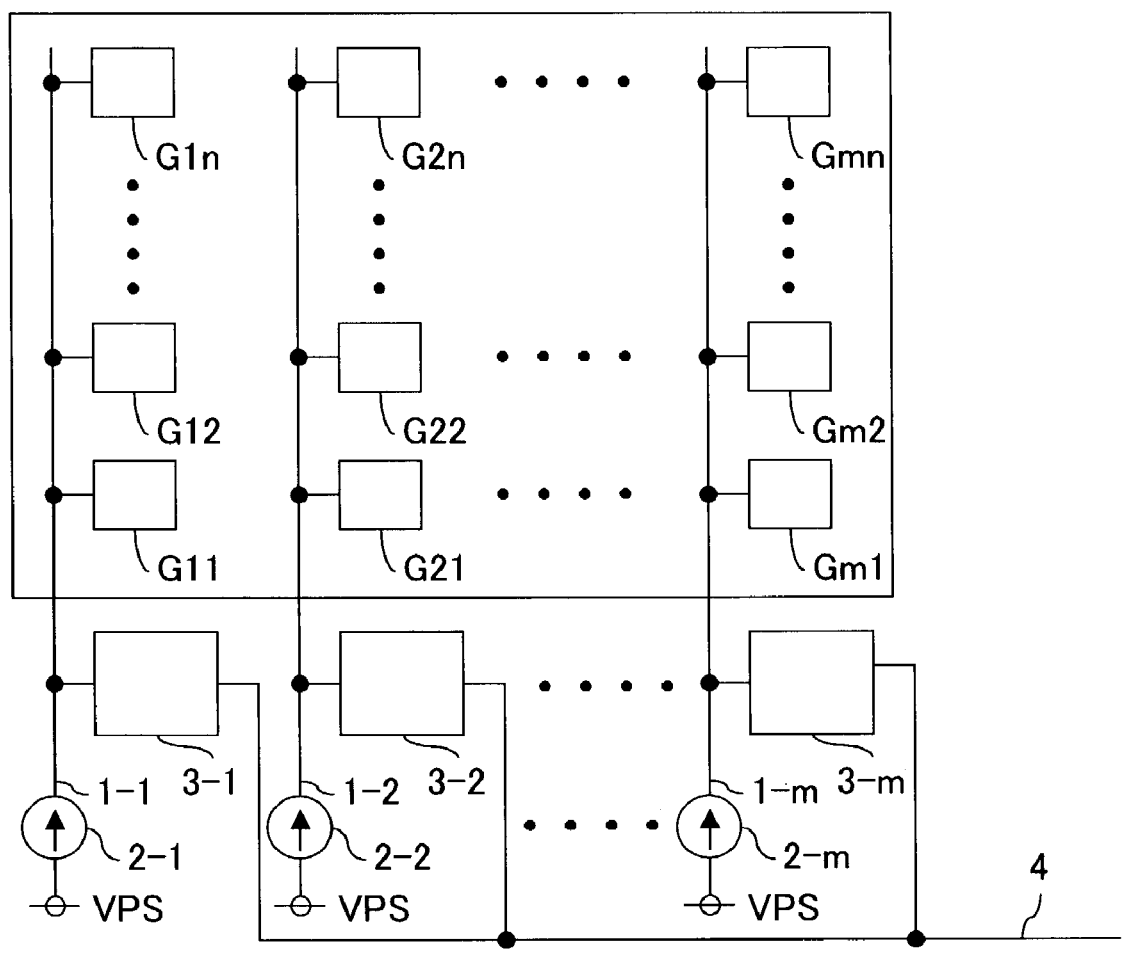
FIG. 1 is a block diagram showing an example of the internal configuration of a solid-state image-sensing device embodying the invention.

First, a solid-state image-sensing device embodying the invention will be described with reference to FIG. 1. FIG. 1 is a block diagram showing the configuration of the solid-state image-sensing device of this embodiment.

The solid-state image-sensing device shown in FIG. 1 is provided with pixels G11 to Gmn, signal lines 1-1 to 1-m each connected to the output sides of the pixels arranged in one of a plurality of columns in which the pixels G11 to Gmn are arranged, constant-current sources 2-1 to 2-m each connected to one of the signal lines 1-1 to 1-m, output circuits 3-1 to 3-m each sampling and holding the image signals and the noise signals fed from the pixels G11 to Gmn by way of one of the signal lines 1-1 to 1-m and then clearing the image signals of noise, and an output signal line 4 by way of which the image signals output from the output circuits 3-1 to 3-m are fed out. The constant-current sources 2-1 to 2-m each receive, at one end thereof, a direct-current voltage VPS.

In this solid-state image-sensing device, an image signal and a noise signal output from the pixel Gab (where "a" is a natural number fulfilling 1≦a≦m and "b" is a natural number fulfilling 1≦b≦n) are both output by way of the signal line 1-a, and are then amplified by the constant-current source 2-a connected to that signal line 1-a. Then, the image and noise signals output from the pixel Gab are successively fed to the output circuit 3-a, which then samples and holds the image and noise signals fed thereto. The output circuit 3-a then corrects the image signal on the basis of the noise signal, so that an image signal cleared of noise is fed out by way of the output signal line 4.

2. An Example of the Configuration of Each Pixel

An example of the configuration of each of the pixels G11 to Gmn provided in the solid-state image-sensing device shown in FIG. 1 will be described below with reference to FIG. 2. In the pixel shown in FIG. 2, a direct-current voltage VPD is applied to the cathode of a photodiode PD, of which the anode is connected to the drain of a MOS transistor T1. The source of the MOS transistor T1 is connected to the gate and drain of a MOS transistor T2 and to the gate of a MOS transistor T3.

The source of the MOS transistor T3 is connected to the gate of a MOS transistor T4 and to the drain of a MOS transistor T5. The source of the MOS transistor T4 is connected to the drain of a MOS transistor T6. The drain of the MOS transistor T6 is connected to a signal line 1 (corresponding to the signal lines 1-1 to 1-m in FIG. 1). The MOS transistors T1 to T6 are all P-channel MOS transistors.

A signal φVPS is fed to the source of the MOS transistor T2, and the direct-current voltage VPD is applied to the drains of the MOS transistors T3 and T4. The source of the MOS transistor T3 is connected to one end of a capacitor C, and the direct-current voltage VPS is applied to the other end of the capacitor C. A direct-current voltage VRG is fed to the source of the MOS transistor T5, and a signal φRS is fed to the gate of the MOS transistor T5. Moreover, signals φS and φV are fed to the gates of the MOS transistors T1 and T6, respectively.

In the pixel configured as described above, a constant-current source 2 (corresponding to the constant-current sources 2-1 to 2-m in FIG. 1) having the direct-current voltage VPS applied to one end thereof is connected, through the MOS transistor T6 and the signal line 1, to the source of the MOS transistor T4. Thus, when the MOS transistor T6 is on, the MOS transistor T4 acts as a source-follower MOS transistor, outputting the signal amplified by the constant-current source 2 to the signal line 1.

How the pixel configured as described above performs image sensing and sensitivity variation detection will be described below. It is to be noted that the signal φVPS is a binary voltage signal that takes either a low-level voltage that permits the MOS transistor T2 to operate in a subthreshold region or a high-level voltage that is higher than that low-level voltage and that permits a larger current to flows through the MOS transistor T2 than when it is fed with a low level as the signal φVPS.

(1) Image Sensing Operation (for Outputting an Image Signal)

Figure 2:
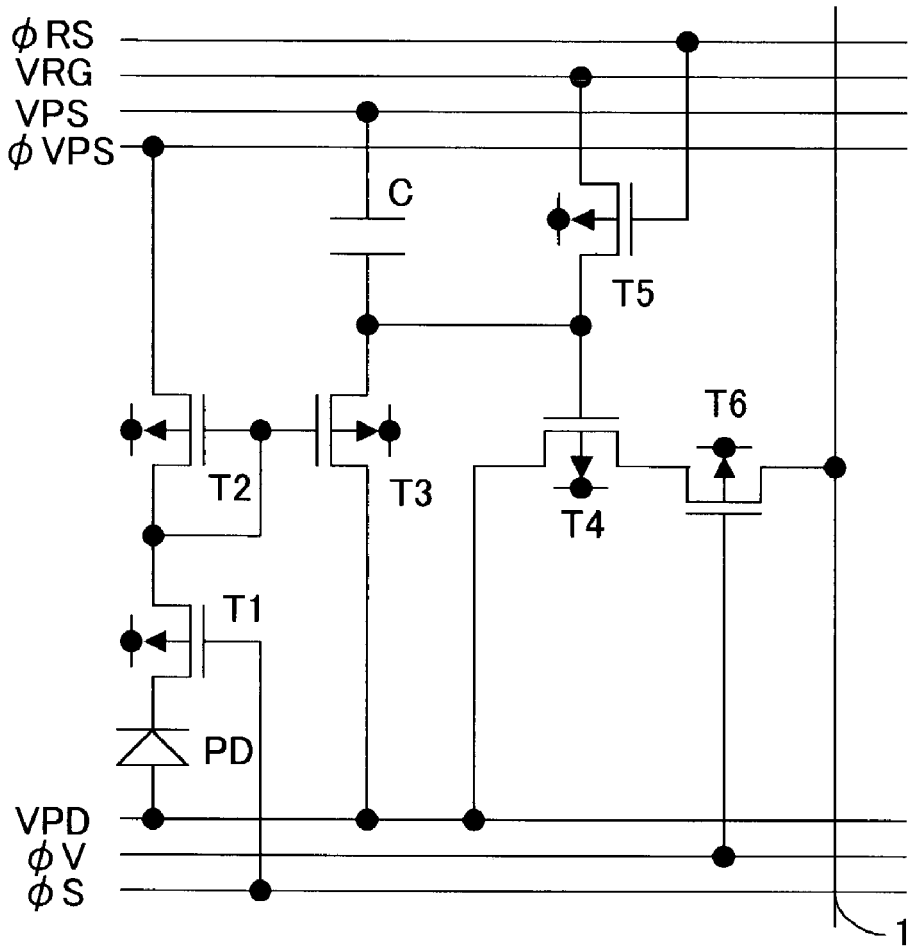
FIG. 2 is a circuit diagram showing the configuration of each pixel.

First, how the pixel configured as shown in FIG. 2 operates to perform image sensing will be described. It is to be noted that the signal φS remains low during image sensing, and thus the MOS transistor T1 remains on. The signal φRS is turned high to turn the MOS transistor T5 off. Then, to permit the MOS transistor T2 to operate in a subthreshold region, a low level is fed as the signal φVPS to the source of the MOS transistor T2. In this state, when light is incident on the photodiode PD, a photocurrent is generated therein, and, owing to the subthreshold characteristic of the MOS transistor, a voltage natural-logarithmically proportional to the photocurrent appears at the gates of the MOS transistors T2 and T3.

This voltage natural-logarithmically proportional to the amount of incident light is current-amplified by the MOS transistor T3, and the resulting drain current of the MOS transistor T3 flows through the capacitor C, thereby discharging it. Thus, the gate voltage of the MOS transistor T4 is natural-logarithmically proportional to the integral of the amount of incident light. When a pulse is fed as the signal φV to the MOS transistor T6, the source current of the MOS transistor T4, which is commensurate with the gate voltage thereof, flows through the MOS transistor T6 and the signal line 1.

At this time, since the MOS transistor T4 acts as a source-follower MOS transistor, an image signal appears as a voltage signal on the signal line 1. Thereafter, the signal φV is turned high to turn the MOS transistor T6 off. Thus, the image signal output through the MOS transistors T4 and T6 has a level proportional to the gate voltage of the MOS transistor T4, and is therefore natural-logarithmically proportional to the integral of the amount of light incident on the photodiode PD.

(2) Sensitivity Variation Detection Operation (for Outputting a Noise Signal)

Figure 3:
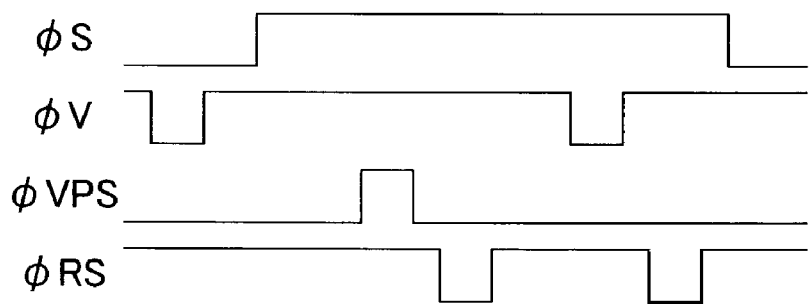
FIG. 3 is a timing chart showing the behavior of the relevant signals when the variation in sensitivity of the pixel shown in FIG. 2 is detected.

Next, how the pixel operates to detect the variation in sensitivity will be described with reference to a timing chart in FIG. 3. After the output of the image signal in response to the pulse fed in as the signal φV, first, the signal φS is turned high to turn the MOS transistor T1 off in order to start resetting. At this time, a positive electric charge flows into the MOS transistor T2 through the source thereof, and it recombines with the negative electric charge accumulated at the gate and drain of the MOS transistor T2 and at the gate of the MOS transistor T3, so that the potential at the gate and drain of the MOS transistor T2 rises to a certain degree.

However, when the potential at the gate and drain of the MOS transistor T2 has risen to that certain degree, resetting slows down. This phenomenon is pronounced particularly when an object that has thus far been bright suddenly becomes dim. To overcome this phenomenon, next, the signal φVPS fed to the source of the MOS transistor T2 is turned high. By raising the source voltage of the MOS transistor T2 in this way, it is possible to increase the amount of positive electric charge that flows into the MOS transistor T2 through the source thereof, and thereby prompt the recombination therewith of the negative electric charge accumulated at the gate and drain of the MOS transistor T2 and at the gate of the MOS transistor T3.

Thus, the potential at the gate and drain of the MOS transistor T2 further rises. When the signal φVPS fed to the source of the MOS transistor T2 is turned low, the MOS transistor T2 restores its original potential state. After the original potential state of the MOS transistor T2 is restored, i.e., the MOS transistor T2 is reset, in this way, a pulse is fed as the signal φRS to the MOS transistor T5 to turn it on in order to initialize the voltage at the node between the capacitor C and the gate of the MOS transistor T4.

When the voltage at the node between the capacitor C and the gate of the MOS transistor T4 becomes commensurate with the gate voltage of the MOS transistor T2 thus reset, a pulse is fed as the signal φV to the gate of the MOS transistor T6 to turn it on so that an output current representing the variation in sensitivity of the pixel, due to variations in the characteristics of the MOS transistors T2 and T3 provided therein, flows through the signal line 1.

At this time, since the MOS transistor T4 acts as a source-follower MOS transistor, a noise signal appears as a voltage signal on the signal line 1. Thereafter, a pulse is fed again as the signal φRS to the MOS transistor T5 to reset the voltage at the node between the capacitor C and the gate of the MOS transistor T4, and subsequently the signal φS is turned low to make the MOS transistor T1 conduct in preparation for image sensing.

3. Configuration and Operation of the Output Circuit

Figure 4:
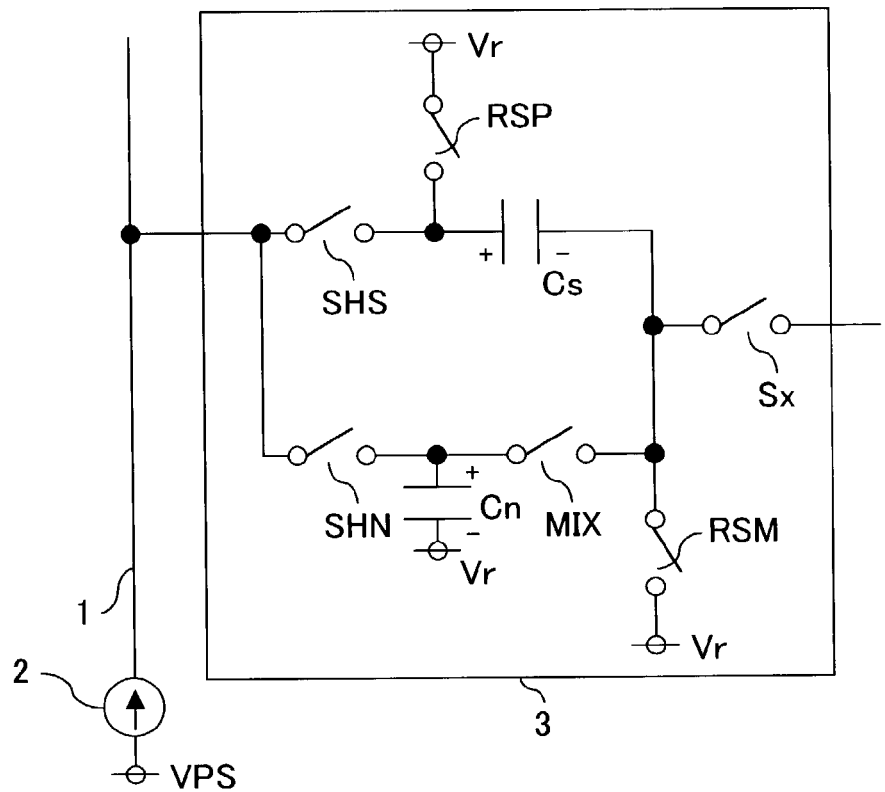
FIG. 4 is a block circuit diagram showing the internal configuration of the output circuit provided in the solid-state image-sensing device of a first embodiment of the invention.
Figure 5:
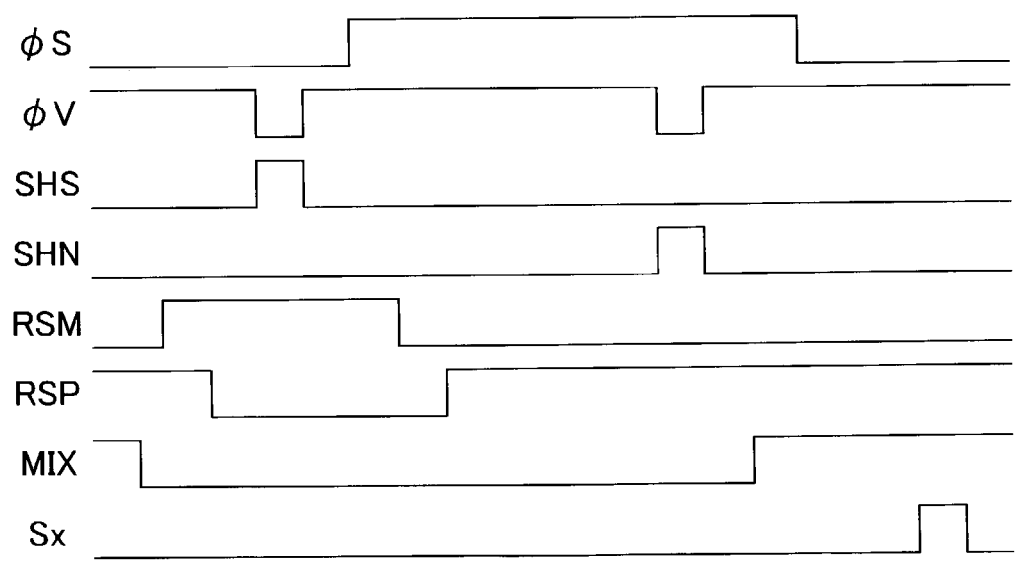
FIG. 5 is a timing chart showing the behavior of the circuit elements constituting the output circuit shown in FIG. 4.

FIG. 4 is a circuit block diagram showing the internal configuration of the output circuit provided in the solid-state image-sensing device shown in FIG. 1. FIG. 5 is a timing chart showing the behavior of different portions of the solid-state image-sensing device embodying the invention.

The output circuit 3 shown in FIG. 4 (corresponding to the output circuits 3-1 to 3-m in FIG. 1) is composed of a capacitor Cs for sampling and holding an image signal fed from the signal line 1 (corresponding to the signal lines 1-1 to 1-m in FIG. 1), a capacitor Cn for sampling and holding a noise signal fed from the signal line 1, a switch SHS connected between the signal line 1 and one end of the capacitor Cs, and a switch SHN connected between the signal line 1 and one end of the capacitor Cn, a switch MIX connected between the other end of the capacitor Cs and the one end of the capacitor Cn, a switch RSP having one end thereof connected to the one end of the capacitor Cs, and switches RSM and Sx having one end thereof connected to the other end of the capacitor Cs.

A direct-current voltage Vr is applied to the other ends of the switches RSP and RSM and to the other end of the capacitor Cn, and the other end of the switch Sx is connected to the output signal line 4, which is the final destination within the solid-state image-sensing device. Moreover, the switches SHS and SHN are connected to the constant-current source 2 by way of the signal line 1. Thus, the image signal appears at the node between the switch SHS and the signal line 1, and the noise signal appears at the node between the switch SHN and the signal line 1.

How the output circuit 3 configured as described above operates will be described below. While, with the signal φS fed to the pixel Gab kept low and thus the MOS transistor T1 kept on, image sensing is being performed, first, with the switch RSP kept on, the switch RSM is turned on to apply the direct-current voltage Vr to both ends of the capacitor Cs, so that the capacitor Cs is reset. At this time, the switches SHS, SHN, MIX, and Sx are off. Thereafter, the switch RSP is turned off, and then the switch SHS is turned on.

In this state, when the signal φV is turned low to turn the MOS transistor T6 on and as a result an image signal appears on the signal line 1, since the switch SHS is on, the image signal, which is a voltage signal, is sampled and held in the capacitor Cs. Thus, assuming that the voltage signal resulting from the image signal has a level Vs, the capacitor Cs is charged with an electric charge $Cs \times (Vs-Vr)$. Then, the switch SHS is turned off and simultaneously the signal φV is turned high, and then the switch RSM is turned off.

When the switch RSM is turned off in this way, an electric charge $-Cs \times (Vs-Vr)$ is held at the negative electrode of the capacitor Cs. In this state, the switch RSP is turned on. In the pixel Gab, the signal φS is turned high to turn the MOS transistor T1 off in order to perform resetting. Then, the signal φV is turned low to turn the MOS transistor T6 on, and simultaneously the switch SHN is turned on so that a noise signal appearing on the signal line 1 is sampled and held in the capacitor Cn. Thus, assuming that the voltage signal resulting from the noise signal has a level Vn, the capacitor Cn is charged with an electric charge $Cn \times (Vn-Vr)$.

Then, the switch SHN is turned off, and simultaneously the signal φV is turned high. Thus, an electric charge $Cn \times (Vn-Vr)$ is held at the positive electrode of the capacitor Cn. That is, the noise signal is held in the capacitor Cn as a signal having the opposite polarity to the image signal held in the capacitor Cs. Thereafter, the switch MIX is turned on, so that an electric charge $C_n \times (V_n - V_r) - C_s \times (V_s - V_r)$ is held at the node between the capacitors Cs and Cn. This means that, assuming that the capacitors Cs and Cn each have a capacitance Cx, an electric charge $C_x \times (V_n - V_s)$ is held at the node between the capacitors Cs and Cn.

Here, the direct-current voltage Vr is applied through the switch RSP to the positive electrode of the capacitor Cs, and is also applied to the negative electrode of the capacitor Cn. And to the capacitors Cs and Cn is applied a voltage $C_x \times (V_n - V_s)/2C_x = (V_n - V_s)/2$. Hence, at the node between the capacitors Cs and Cn appears a voltage $(V_n - V_s)/2 + V_r$. When this voltage, equal to the difference between the noise and image signals, appears at the node between the capacitors Cs and Cn, the switch Sx is turned on to output it as a voltage signal. That is, an image signal cleared of noise is output to the output signal line 4.

While the output circuit 3 is operating in this way, in the pixel Gab, after the output of the noise signal, the signal φS is turned low to turn the MOS transistor T1 on in preparation for the next session of image sensing. In the output circuit 3, after the output of the noise-free image signal, the switch Sx is turned off. When the image signals from one pixel after another in one row of pixels have been output to the output signal line 4, the switch MIX is turned off in preparation for the next session of sampling and holding.

With each output circuit 3 operating as described above, first, the pixels G1k to Gmk (where "k" is a natural number fulfilling $1 \leq k \leq n$) perform image sensing, and output image signals simultaneously, which are sampled and held in the capacitors Cn of the corresponding output circuits 3-1 to 3-m. Next, the pixels G1k to Gmk performs resetting, and output noise signals simultaneously, which are sampled and held in the capacitors Cs of the corresponding output circuits 3-1 to 3-m. Then, in the individual output circuits 3-1 to 3-m, the switches MIX are turned on, so that image signals cleared of noise appear as voltage signals at the node between the capacitors Cs and Cn.

When the noise-free image signals have been produced in the output circuits 3-1 to 3-m in this way, first, the switch Sx of the output circuit 3-1 is turned on so that the noise-free image signal from the pixel G1k is output to the output signal line 4. Thereafter, the switches Sx of the output circuits 3-2, 3-3, ..., 3-m are turned on one after another in this order, so that the noise-free signals from the pixels G2k, G3k, ..., Gmk are output one after another in this order to the output signal line 4.

After the noise-free image signals from the pixels G1k to Gmk are output consecutively from the output circuits 3-1 to 3-m to the output signal line 4 in this way, the image and noise signals from the pixels G1(k+1) to Gm(k+1) are sampled and held in the output circuits 3-1 to 3-m, respectively. Then, the noise-free image signals from the pixels G1(k+1) to Gm(k+1) are consecutively output to the output signal line 4. In this way, the image signals from the pixels G11 to Gmn are corrected for variations in sensitivity on the basis of the corresponding noise signals from the pixels G11 to Gmn, and are then output as noise-free image signals.

As described above, in the solid-state image-sensing device of this embodiment, during the horizontal blanking periods, in which image signals are read out from pixels and output, the output circuit provided in each column clears image signals of noise by the use of noise signals. In this way, it is possible to prevent lowering of the operation rate of a solid-state image-sensing device while securing a sufficient exposure time, and thereby realize a solid-state image-sensing device that can operate at a high rate. Clearing noise during the horizontal blanking periods helps reduce the influence of clock noise.

In this embodiment, in a case where the switches provided in each output circuit are realized with MOS transistors, an output circuit in the process of outputting an image signal to an output signal line is connected, through the output signal line, in parallel with the switch Sx provided in an output circuit that is not outputting a signal, and is thus influenced by the parasitic capacitance of that switch Sx. To prevent such influence of the parasitic capacitance of the switch Sx, the capacitors Cs and Cn need to be given sufficiently high capacitances.

Second Embodiment

Figure 6:
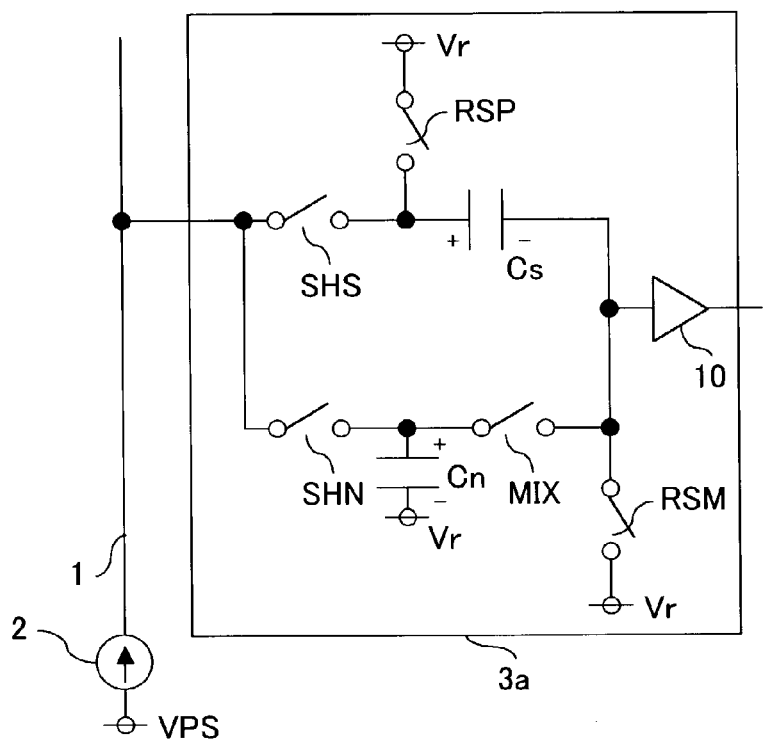
FIG. 6 is a block circuit diagram showing the internal configuration of the output circuit provided in the solid-state image-sensing device of a second embodiment of the invention.

A second embodiment of the present invention will be described below with reference to the drawings. FIG. 6 is a block circuit diagram showing the configuration of the output circuit provided in the solid-state image-sensing device of this embodiment. In this embodiment, the solid-state image-sensing device as a whole and each pixel thereof are configured in the same manner as in the first embodiment, i.e., as shown in FIGS. 1 and 2, respectively. Therefore, in those respects, reference is to be made to the first embodiment, and no overlapping explanations will be repeated. In FIG. 6, such circuit elements and components used for the same purposes as in FIG. 4 are identified with the same reference numerals and symbols, and their detailed explanations will be omitted.

As shown in FIG. 6, in the output circuit 3a (corresponding to the output circuits 3-1 to 3-m in FIG. 1) of this embodiment, a buffer 10 is provided instead of the switch Sx used in the output circuit 3 shown in FIG. 4. That is, the node between the capacitor Cs and the switch MIX is connected to the input side of the buffer 10, and the output side of the buffer 10 is connected to the output signal line 4. Thus, when the buffer 10 is turned on, a voltage signal based on the noise-free image signal appearing at the input side of the buffer 10 appears at the output side of the buffer 10, and is output as an image signal to the output signal line 4.

The output circuit 3a configured as described above operates according to the timing chart shown in FIG. 5, as does the output circuit 3 of the first embodiment. Here, however, at the time point when the switch Sx is turned on in the first embodiment, the buffer 10 is turned on instead. In all other respects, the output circuit 3a operates just as in the first embodiment, and therefore no explanations will be repeated of its operation.

In the output circuit 3a of this embodiment, providing the buffer 10 instead of the switch Sx as described above helps prevent the noise-free image signal appearing at the input side of the buffer 10 from being influenced by circuit elements provided in other output circuits 3a. This helps prevent the influence of the parasitic capacitance of the switch Sx as encountered in the first embodiment, and thus eliminates the need to give the capacitors Cs and Cn high capacitances as in the first embodiment.

In this embodiment, the node between the capacitors Cs and Cn is connected directly to the input side of the buffer 10, and therefore the input-side capacitance of the buffer 10 influences the capacitors Cs and Cn. Especially, when the capacitor Cs samples and holds an image signal, it is greatly influenced by that capacitance of the buffer 10. Accordingly, the buffer 10 needs to be designed to have a sufficiently low capacitance.

Third Embodiment

Figure 7:
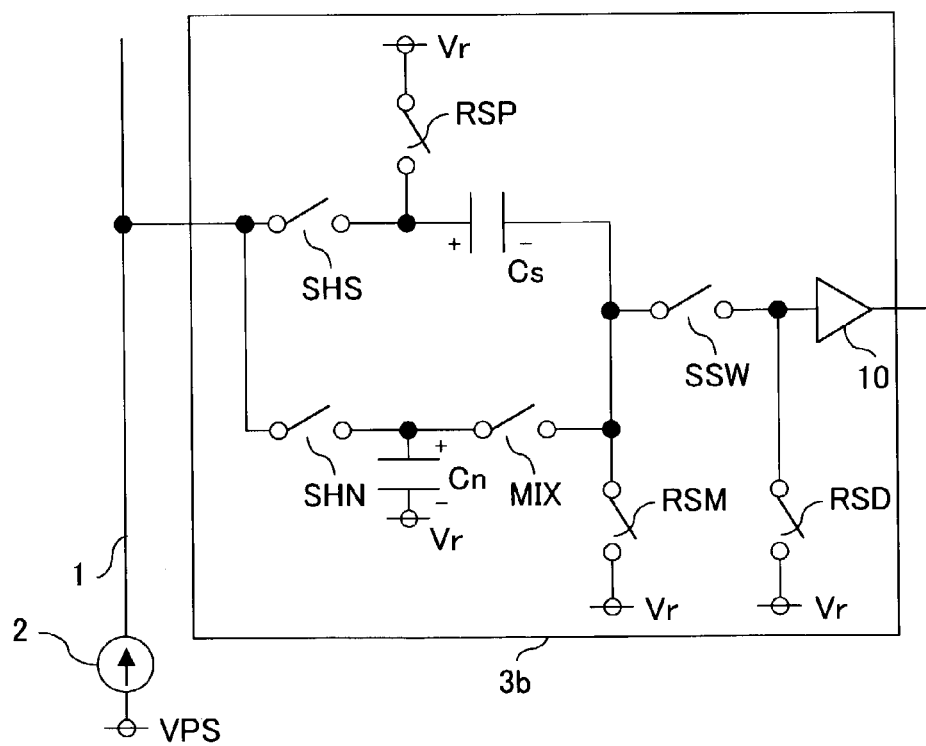
FIG. 7 is a block circuit diagram showing the internal configuration of the output circuit provided in the solid-state image-sensing device of a third embodiment of the invention.

A third embodiment of the present invention will be described below with reference to the drawings. FIG. 7 is a block circuit diagram showing the configuration of the output circuit provided in the solid-state image-sensing device of this embodiment. In this embodiment, the solid-state image-sensing device as a whole and each pixel thereof are configured in the same manner as in the first embodiment, i.e., as shown in FIGS. 1 and 2, respectively. Therefore, in those respects, reference is to be made to the first embodiment, and no overlapping explanations will be repeated. In FIG. 7, such circuit elements and components used for the same purposes as in FIG. 6 are identified with the same reference numerals and symbols, and their detailed explanations will be omitted.

As shown in FIG. 7, the output circuit 3b (corresponding to the output circuits 3-1 to 3-m in FIG. 1) of this embodiment is obtained by providing the output circuit 3a shown in FIG. 6 additionally with a switch SSW connected between the input side of the buffer 10 and the node between the capacitor Cs and the switch MIX and a switch RSD having one end thereof connected to the input side of the buffer 10 and having the direct-current voltage Vr applied to the other end thereof.

Figure 8:
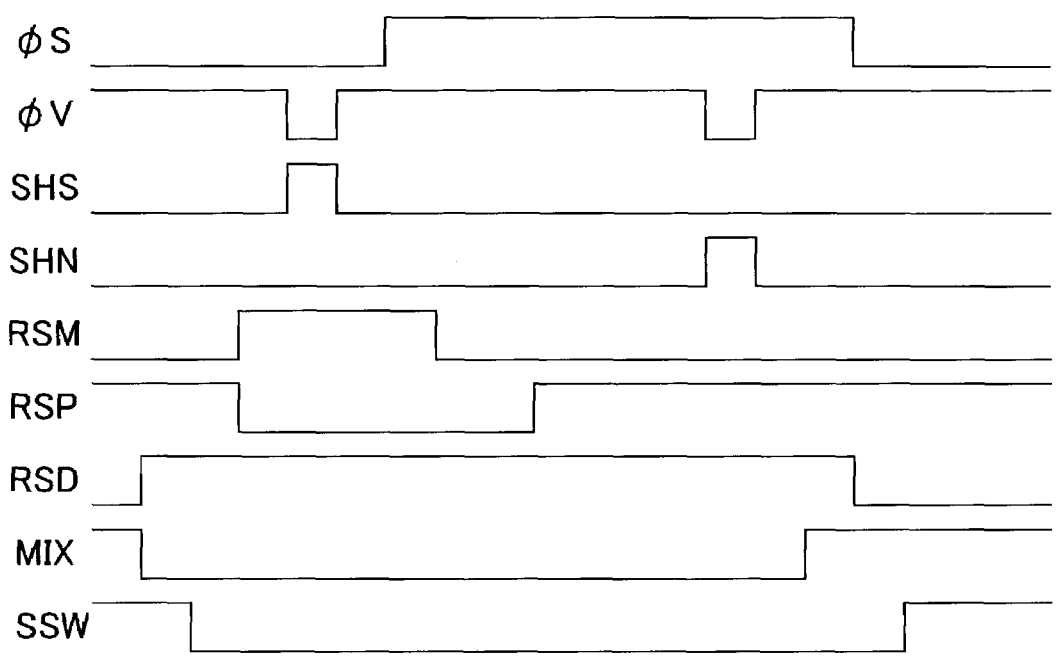
FIG. 8 is a timing chart showing the behavior of the circuit elements constituting the output circuit shown in FIG. 7.

This output circuit 3b operates according to the timing chart shown in FIG. 8. Now, how the output circuit 3b operates will be described. While, with the signal φS fed to the pixel Gab kept low, image sensing is being performed, the switch MIX is turned off and simultaneously the switch RSD is turned on. At this time, the switches RSP and SSW are on, and the switches SHS, SHN, and RSM are off. Accordingly, the direct-current voltage Vr is applied to both ends of the capacitor Cs, i.e., through the switch RSP to one end thereof and through the switches SSW and RSD to the other end thereof, and thus the capacitor Cs is reset.

Thereafter, the switch SSW is turned off to electrically disconnect the capacitor Cs from the buffer 10, and then the switch RSP is turned off and simultaneously the switch RSM is turned on. In this state, when the switch SHS is turned on and simultaneously, in the pixel Gab, the signal φV is turned low, a voltage signal resulting from an image signal appearing on the signal line 1 is sampled and held in the capacitor Cs. Then, the signal φV is turned high and simultaneously the switch SHS is turned off.

Thereafter, the signal φS is turned high to start resetting. Then, the switch RSM is turned off, and then the switch RSP is turned on. Next, when the signal φV is turned low and as a result a noise signal appears on the signal line 1, the switch SHN is turned on, so that the noise signal is sampled and held in the capacitor Cn. Then, the switch SHN is turned off and simultaneously the signal φV is turned high. Subsequently, the switch MIX is turned on.

At this time, the electric charge held at the negative electrode of the capacitor Cn is mixed with the electric charge held at the positive electrode of the capacitor Cs, so that a voltage equal to the difference between the noise and image signals, namely (Vn−Vs)/2+Vr, appears at the node between the capacitors Cs and Cn. Thereafter, the switch RSD is turned off. Here, as a result of the switch RSD having been on up to this point, the input side of the buffer 10 is reset. Then, the switch SSW is turned on, so that a voltage signal equal to the difference between the noise and image signals is fed to the buffer 10.

The output circuits 3-1 to 3-m, provided one in each column, each operate as described above. As a result, the image and noise signals from the pixels G1k to Gmk in one row of pixels are held in the output circuits 3-1 to 3-m, respectively, and then voltage signals equal to the differences between the noise and image signals are produced and are fed to the buffers 10 provided in the respective output circuits 3-1 to 3-m. When the voltage signals equal to the differences between the noise and image signals have been fed to the buffers 10 of the output circuits 3-1 to 3-m in all the columns, the buffers 10 of the output circuits 3-1, 3-2, . . . , 3-m are turned on one after another in this order, so that noise-free image signals from the pixels G1k, G2k, . . . , Gmk are output one after another in this order to the output signal line 4.

As described above, in the output circuit 3b of this embodiment, after the image and noise signals are sampled and held in the capacitors Cs and Cn until the voltage signal equal to their difference is produced, the switch SSW is kept off. This makes it possible to produce a noise-free image signal without being influenced by the input-side capacitance of the buffer 10.

Fourth Embodiment

Figure 9:
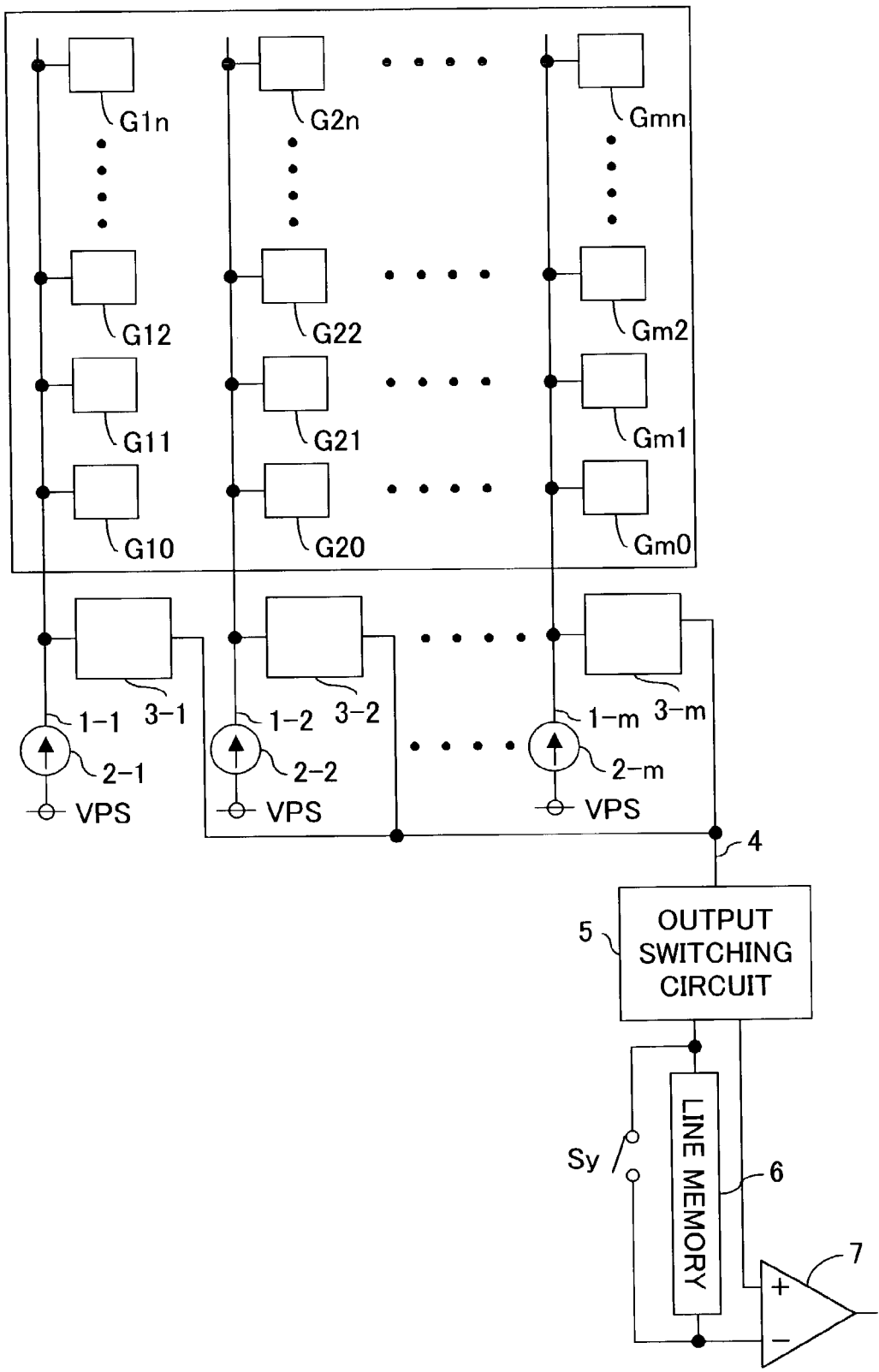
FIG. 9 is a block diagram showing another example of the internal configuration of a solid-state image-sensing device embodying the invention.

A fourth embodiment of the present invention will be described below. FIG. 9 is a block diagram showing the configuration of the solid-state image-sensing device of this embodiment. In FIG. 9, such circuit elements and components used for the same purposes as in FIG. 1 are identified with the same reference numerals and symbols, and their detailed explanations will be omitted.

The solid-state image-sensing device shown in FIG. 9 is obtained by providing the solid-state image-sensing device shown in FIG. 1 additionally with correction pixels G10 to Gm0 arranged in a row immediately under the pixels G11 to Gm1. These correction pixels G10 to Gm0 serve as dummy pixels for correcting the image signals output from the pixels G11 to Gmn. Moreover, the image signals output by way of the output signal line 4 is fed to an output switching circuit 5, which then determines whether to feed the image signals to a line memory 6 or to the non-inverting input terminal of a differential amplifier circuit 7. Furthermore, the output side of the line memory 6 is connected to the inverting input terminal of the differential amplifier circuit 7, and a switch Sy is connected between the input and output sides of the line memory 6.

Figure 10:
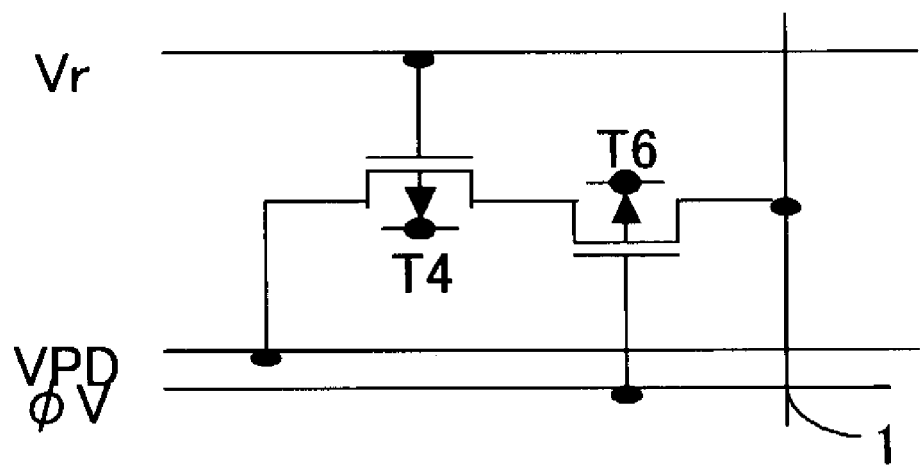
FIG. 10 is a circuit diagram showing the configuration of a correction pixel.
Figure 11:
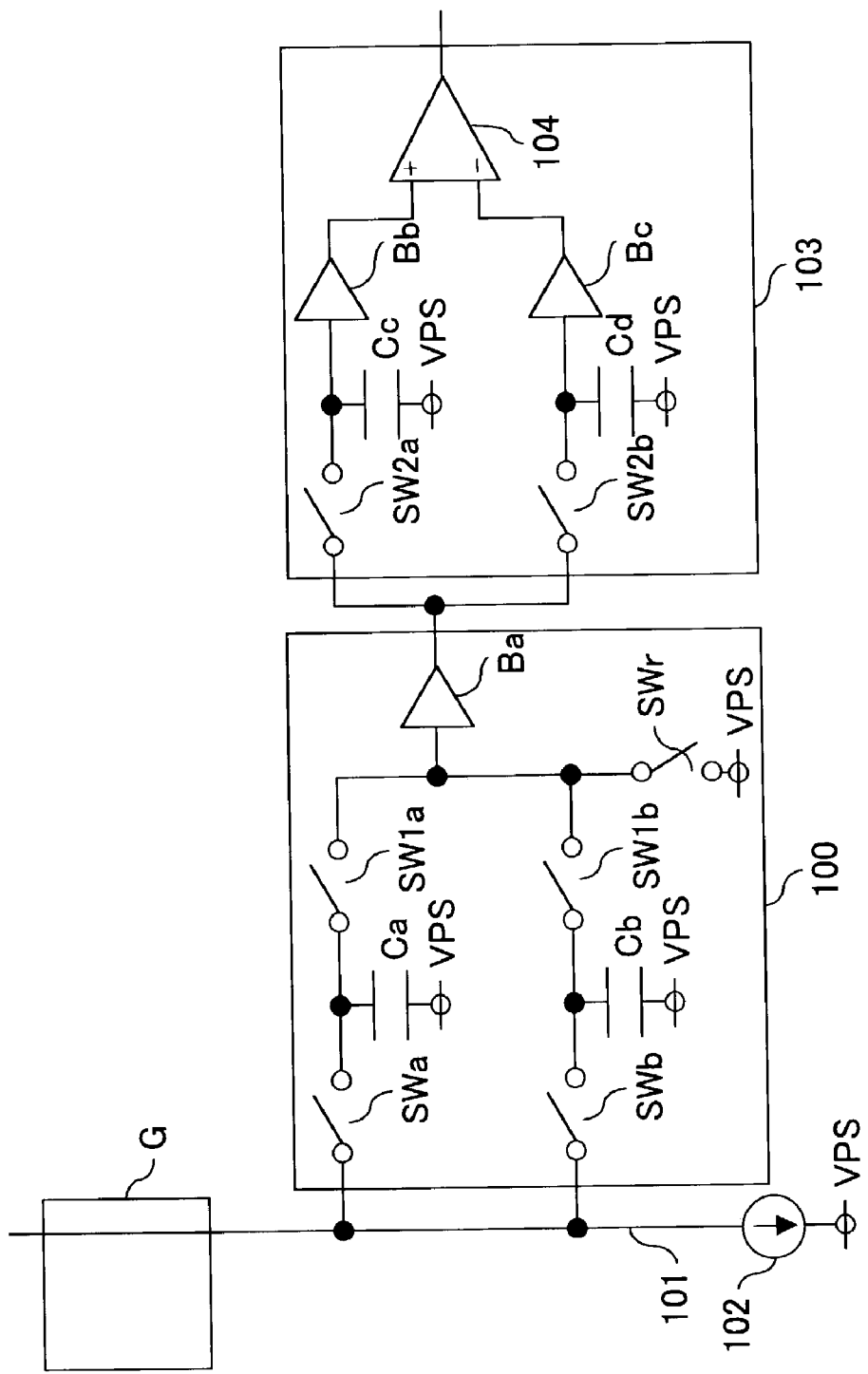
FIG. 11 is a block diagram showing a principal portion of a conventional solid-state image-sensing device.

In the solid-state image-sensing device configured as described above, the pixels G11 to Gmn are each configured as in the first to third embodiments, i.e., as shown in FIG. 2, and the output circuits 3-1 to 3-m are each configured as in the third embodiment, i.e., like the output circuit 3b shown in FIG. 7. The correction pixels G10 to Gm0 are each configured as shown in FIG. 10, i.e., composed of a MOS transistor T4 having the direct-current voltage VPD applied to the drain thereof and a MOS transistor T6 having the signal φV fed to the gate thereof. The direct-current voltage Vr is applied to the gate of the MOS transistor T4.

In the correction pixels G10 to Gm0 configured as shown in FIG. 10, as they are fed with the relevant signals with the same timing as the pixels G11 to Gmn, they each operate as follows. When a pulse is fed in as the signal φV, an image signal and a noise signal, having the same voltage, are output. Thus, in the output circuits 3-1 to 3-m, when the switch MIX is on, the voltage appearing at the node between the capacitors Cs and Cn is equal to Vr.

Then, the buffers 10 provided in the output circuits 3-1 to 3-m are turned on one after another, so that image signals for correction from the correction pixels G10, G20, . . . , Gm0 are output one after another in this order by way of the output signal line 4 to the output switching circuit 5. Here, the output switching circuit 5 is so switched that the signals fed thereto are output to the line memory 6. Thus, the m correction image signals fed from the correction pixels G10, G20, . . . , Gm0 to the output switching circuit 5 are fed one after another in this order to the line memory 6.

Thereafter, the image signals from the pixels G11 to Gmn are output one after another, starting with the pixel G11, by way of the output signal line 4 to the output switching circuit 5. Here, the image and noise signals from the pixels G1k to Gmk are simultaneously sampled and held in the output circuits 3-1 to 3-m, then noise-free image signals are produced, and then the buffers 10 of the output circuits 3-1, 3-2, . . . , 3-m are turned on one after another in this order, so that the image signals from the pixels G1k, G2k, . . . , Gmk are fed one after another in this order to the output switching circuit 5.

Now, the output switching circuit 5 connects the output signal line 4 to the non-inverting input terminal of the differential amplifier circuit 7, and the switch Sy is turned on. Thus, the image signals from the pixels G1k, G2k, . . . , Gmk are fed one after another in this order to the non-inverting input terminal of the differential amplifier circuit 7. Simultaneously, the correction image signals from the correction pixels G10, G20, . . . , Gm0, which are stored in the line memory 6 in this order, are fed to the inverting input terminal of the differential amplifier circuit 7. The correction image signals from the correction pixels G10, G20, . . . , Gm0, thus output from the line memory 6, are fed back, in the same order, to the line memory 6 through the switch Sy.

The buffer 10 provided in the output circuit $3b$ has an offset voltage such that, when the voltage at its input side is Vin, the voltage at its output side is A×Vin+V. Accordingly, when an image signal Vs and a noise signal Vn are fed from the pixel Gab to the output circuit $3b$, the output circuit $3b$ outputs an image signal A×((Vn−Vs)/2+Vr)+V. When this image signal from the pixel Gab is fed to the non-inverting input terminal of the differential amplifier circuit 7, a correction image signal A×Vr+V for the correction pixel Ga0 is fed to the inverting input terminal of the differential amplifier circuit 7. Thus, the differential amplifier circuit 7 outputs an image signal B×(Vn−Vs), i.e., an image signal cleared of the offset voltage.

As a result of the differential amplifier circuit 7 operating in this way, the image signals fed thereto from the pixels G1k, G2k, . . . , Gmk one after another in this order are cleared of the offset voltage on the basis of the correction image signals fed thereto from the correction pixels G10, G20, . . . , Gm0 one after another in this order. When the differential amplifier circuit 7 has output the image signals from the pixels G1k to Gmk after clearing them of the offset voltage, then it repeats the same operation on the image signals from the pixels G1(k+1) to Gm(k+1), and so forth. In this way, the differential amplifier circuit 7 outputs the offset-voltage-free image signals from the pixels G11 to Gmn. This helps prevent fixed-pattern noise ascribable to the buffer 10 included in the output circuit $3b$ provided in each column.

In this embodiment, the output circuit is configured as in the third embodiment, i.e., as shown in FIG. 7. However, the output circuit may be configured as in the first or second embodiment, i.e., as shown in FIG. 4 or 6, so long as it meets necessary requirements.

The correction pixels, serving as dummy pixels, may be configured in any other manner than as shown in FIG. 10; for example, they may be so configured as to include an element that performs photoelectric conversion as shown in FIG. 2. In that case, as in FIG. 10, a constant voltage is kept applied to the gate of the MOS transistor T4 all the time. The correction pixels may be provided in more than one row, in which case the image signals therefrom are averaged in each column to produce correction image signals. The image signals from the correction pixels may be read out and stored in the line memory once every more than one frame.

In the first to fourth embodiments described above, the pixels provided in the solid-state image-sensing device are each configured as shown in FIG. 2. However, the pixels may be configured in any other manner; for example, they may be so configured as to convert the image signals linearly, or may be composed of N-channel MOS transistors.

According to the present invention, an image signal and a noise signal are held as signals having mutually opposite polarities. Thus, simply by combining together the image and noise signals, it is possible to readily produce an image signal cleared of noise. This eliminates the need to output a sampled-and-held image signal and a sampled-and-held noise signal separately and then clear the image signal of noise as conventionally practiced, and makes it possible to achieve the end simply by outputting a noise-free image signal produced by an output circuit. This permits faster operation.

What is claimed is:

1. A solid-state image-sensing device comprising:
   a pixel that generates an image signal commensurate with an amount of incident light and a noise signal representing a variation in sensitivity;
   an output circuit that holds, with opposite polarities, the image and noise signals output from the pixel and that combines together the image and noise signals thus held with opposite polarities so as to produce and output a noise-free image signal; and
   wherein the output circuit comprises:
   a first switch having one end thereof connected to a signal line to which the image signal is output from the pixel;
   a second switch having one end thereof connected to the signal line to which the noise signal is output from the pixel;
   a first capacitor, having one end thereof connected to another end of the first switch, for sampling and holding the image signal;
   a second capacitor, having one end thereof connected to another end of the second switch and having a reference voltage constantly applied to another end thereof, for sampling and holding the noise signal;
   a third switch having one end thereof connected to another end of the first capacitor and having another end thereof connected to a node between the second switch and the second capacitor;
   a fourth switch having one end thereof connected to a node between the first capacitor and the first switch and having the reference voltage constantly applied to another end thereof; and
   a fifth switch having one end thereof connected to a node between the first capacitor and the third switch and having the reference voltage constantly applied to another end thereof.

2. A solid-state image-sensing device as claimed in claim 1, wherein the signal line is connected to a constant-current source.

3. A solid-state image-sensing device as claimed in claim 1, wherein the output circuit further comprises:
   a sixth switch, having one end thereof connected to the node between the first capacitor and the third switch, that, when turned on, outputs the noise-free image signal.

4. A solid-state image-sensing device as claimed in claim 1, wherein the output circuit further comprises:
a buffer, having an input side thereof connected to the node between the first capacitor and the third switch, that, when turned on, outputs the noise-free image signal.

5. A solid-state image-sensing device as claimed in claim 4, wherein the output circuit further comprises:
a sixth switch having one end thereof connected to the node between the first capacitor and the third switch and having another end thereof connected to the input side of the buffer.

6. A solid-state image-sensing device as claimed in claim 5, wherein the output circuit further comprises:
a seventh switch, having one end thereof connected to the input side of the buffer and having the reference voltage applied to another end thereof, for resetting the input side of the buffer.

7. A solid-state image-sensing device as claimed in claim 1, wherein the signals output from the pixel are logarithmically proportional to the amount of incident light.

8. A solid-state image-sensing device comprising:
a plurality of pixels arranged in a matrix-like array and each generating an image signal commensurate with an amount of incident light and a noise signal representing a variation in sensitivity;
an output circuit that holds, with opposite polarities, the image and noise signals output consecutively from one pixel after another in one row of pixels, and that combines together the image and noise signals thus held with opposite polarities so as to produce and output, for one column of pixels after another, noise-free image signals; and
wherein the output circuit has a plurality of channels, one for each column of pixels, and the channels each comprise:
a first switch having one end thereof connected to a signal line to which the image signal is output from the pixels;
a second switch having one end thereof connected to the signal line to which the noise signal is output from the pixels;
a first capacitor, having one end thereof connected to another end of the first switch, for sampling and holding the image signal;
a second capacitor, having one end thereof connected to another end of the second switch and having a reference voltage constantly applied to another end thereof, for sampling and holding the noise signal;
a third switch having one end thereof connected to another end of the first capacitor and having another end thereof connected to a node between the second switch and the second capacitor;
a fourth switch having one end thereof connected to a node between the first capacitor and the first switch and having the reference voltage constantly applied to another end thereof; and
a fifth switch having one end thereof connected to a node between the first capacitor and the third switch and having the reference voltage constantly applied to another end thereof.

9. A solid-state image-sensing device as claimed in claim 8, wherein the image signals are cleared of noise during horizontal blanking periods.

10. A solid-state image-sensing device as claimed in claim 8, wherein the signal line of each column of pixels is connected to a constant-current source.

11. A solid-state image-sensing device as claimed in claim 8, wherein the signals output from each pixel are logarithmically proportional to the amount of incident light.

12. A solid-state image-sensing device as claimed in claim 8, wherein each pixel generates a noise signal for each frame.

13. A solid-state image-sensing device as claimed in claim 8, wherein each pixel comprises:
a photoelectric conversion element that outputs an electric signal commensurate with the amount of incident light;
a logarithmic conversion MOS transistor for converting the electric signal output from the photoelectric conversion element to an electric signal proportional to a logarithm of the amount of incident light; and
a switch for electrically connecting and disconnecting the photoelectric conversion element to and from the MOS transistor.

14. A solid-state image-sensing device as claimed in claim 8, further comprising:
correction pixels that output a constant image signal and a constant noise signal irrespective of the amount of incident light;
a line memory for storing correction image signals produced by and output from the output circuit based on the image and noise signals output from the correction pixels; and
a correction circuit for canceling, based on the correction image signals stored in the line memory, offsets included in the noise-free image signals obtained from the individual pixels and output from the output circuit.

15. A solid-state image-sensing device as claimed in claim 14, wherein the correction pixels are formed by output-side structures that constitute part of the pixels.

16. A solid-state pixel sensitivity variation correcting device, comprising:
an output circuit for holding, with opposite polarities, image and noise signals output from a pixel, and for combining together the image and noise signals so as to produce and output noise-free image signals, and
wherein the output circuit comprises:
a first switch having one end thereof connected to a signal line to which the image signal is output from the pixel;
a second switch having one end thereof connected to the signal line to which the noise signal is output from the pixel;
a first capacitor, having one end thereof connected to another end of the first switch, for sampling and holding the image signal;
a second capacitor, having one end thereof connected to another end of the second switch and having a reference voltage constantly applied to another end thereof, for sampling and holding the noise signal;
a third switch having one end thereof connected to another end of the first capacitor and having another end thereof connected to a node between the second switch and the second capacitor;
a fourth switch having one end thereof connected to a node between the first capacitor and the first switch and having the reference voltage constantly applied to another end thereof; and
a fifth switch having one end thereof connected to a node between the first capacitor and the third switch and having the reference voltage constantly applied to another end thereof.

* * * * *